United States Patent [19]

Rosen

[11] 4,156,314
[45] May 29, 1979

[54] ROTORS FOR A CIPHERING MACHINE

[76] Inventor: Leo Rosen, Apt. C, Heritage Apartments, River Rd., Essex, Conn. 06426

[21] Appl. No.: 523,248

[22] Filed: Feb. 21, 1944

[51] Int. Cl.² .............................................. H04L 9/00
[52] U.S. Cl. ........................................ 35/4; 339/18 R
[58] Field of Search ................. 173/259.2, 324.7, 328; 35/4; 197/4; 178/22; 339/18 R, 218 M, 215 S, 260

[56] References Cited
U.S. PATENT DOCUMENTS

| 1,510,441 | 9/1924 | Hebern | 35/4 |
| 2,125,995 | 8/1938 | Doidge | 35/4 |
| 2,373,890 | 4/1945 | Hebern | 35/4 |
| 2,402,182 | 6/1946 | Rosen | 35/4 |

Primary Examiner—Howard Birmiel
Attorney, Agent, or Firm—John R. Utermohle

EXEMPLARY CLAIM

1. In a cryptographing machine, a commutator comprising a disc of insulation having an axial opening therethrough and having a peripheral flange thereon, and having a plurality of slots formed in its inner surface, a plurality of contacts anchored in a ring in one surface of said disc, a plurality of second contacts each having a springy end retaining that contact in readily detachable position in one of said slots and a springy intermediate portion and a contact proper supported by said intermediate portion, and conductors connecting said contacts to said second contacts in pairs disposed heterogeneously around said ring.

3 Claims, 4 Drawing Figures

INVENTOR
LEO ROSEN
BY William D. Hall.

ROTORS FOR A CIPHERING MACHINE

This invention relates to cryptographing, ciphering, or coding machines of the type in which electricity is transmitted from one terminal over a circuit composed, at least in part, by contacts carried by a plurality of relatively rotatable discs to another terminal. Upon relative movement of one or more of the discs, the current is conducted to a different output terminal. Thus a different ciphering arrangement is formed each time a disc is rotated. These discs are provided with two pluralities or sets of contacts, each set arranged in a separate ring or circle on a surface of the disc and adapted to form terminals or to engage corresponding contacts on an adjoining disc. Each contact of the separate sets or pluralities is connected by means of a conductor to a contact of the other set or plurality so that the contacts are joined in pairs.

It is an object of my invention to provide in the connection between each pair of contacts, a readily attachable and detachable device. This permits the contacts to be readily connected together in different arrangements of pairs which increases enormously the number of ciphering combinations which can be formed with one device without necessitating the use of additional parts.

Further objects of my invention will be apparent as the description proceeds.

In the drawings

Figure 1:
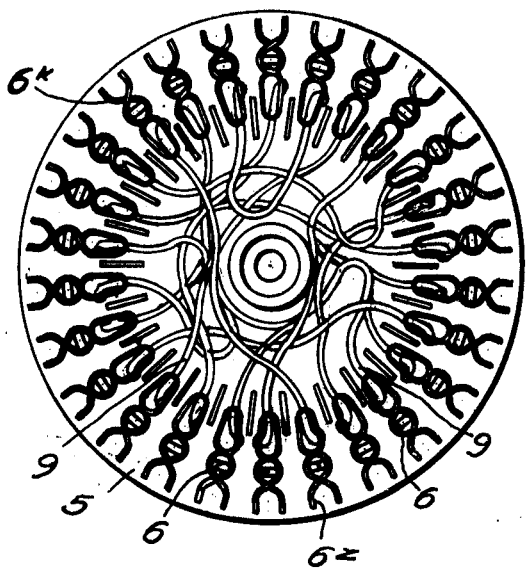
FIG. 1 is a side elevation of one embodiment of my invention.
Figure 3:
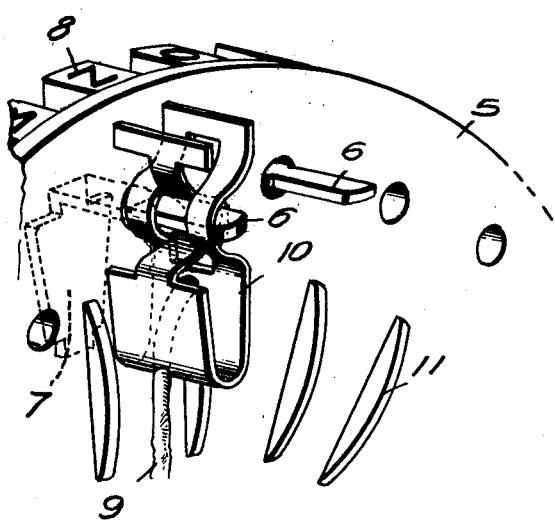
FIGS. 3 and 4 are perspective views of portions of the rotors shown in FIGS. 1 and 2, respectively.

Referring to FIGS. 1 and 3, a rotor is shown which forms the inmost or end rotor, i.e., the rotor which is the furthest of the bank of rotors from the input terminals. This rotor consists of a disc or body 5 of insulation. From the front face of body 5, as seen in FIGS. 1 and 3, project twenty-six (in the example shown) tangs 6 each connected to a flat contact 7 on the rear face. Only one of these contacts 7 is shown in the drawings. Adjacent each contact 7 and tang 6, body 5 carries an identifying letter 8. Contacts 7 are connected together in pairs by conductors 9 which have at each end thereof readily detachable connectors 10 shown as of the Fahnestock type. On its front face, disc 5 has a plurality of projections 11 which provide walls of insulation between the adjacent detachable connectors 10.

The operation of my device, when it is desired to alter the ciphering combination by changing the connections, is thought to be obvious. For example, the Fahnestock clips, marked 6K and 6Z in FIG. 1, are detached. These clips, together with the connector 9 between them, can be removed from the rotor. One or more other pairs of Fahnestock clips can also be disconnected and the clips reconnected in another arrangement with different pairs of contacts 7 and tangs 6 connected together.

Figure 2:
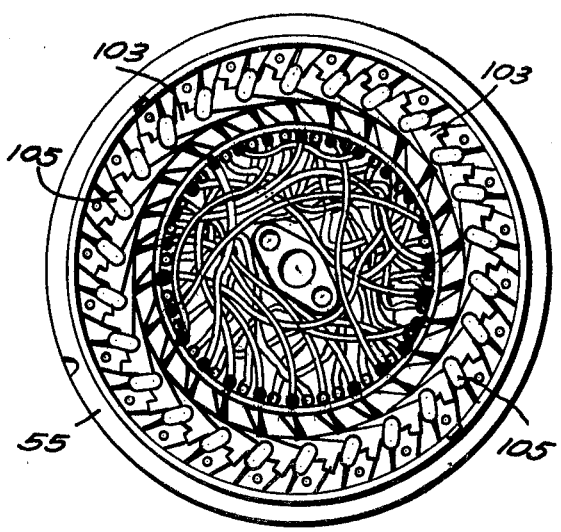
FIG. 2 is a side elevation of a modification of my invention with the cover removed.
Figure 4:
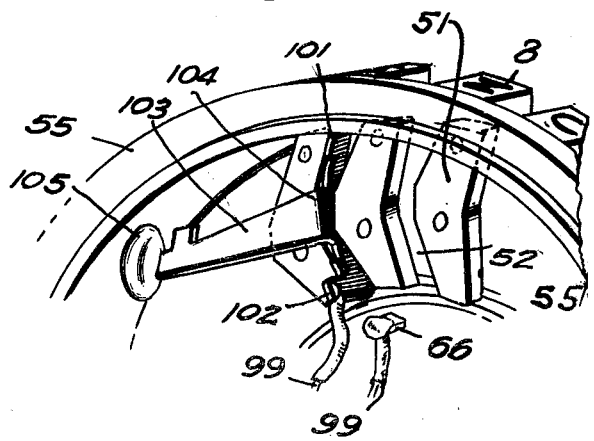

Referring now to FIGS. 2 and 4, there is shown a modification in which a disc or body 55 of insulation has on the rear face a number of embedded contacts similar to the contact shown at 7 in FIG. 3. Each of these contacts has as a part thereof a tang 66 which projects through the body 55 to the front face thereof and to which an end of a conductor 99 is soldered or otherwise attached. Body 55 also carries on its front face a number of blocks 51 which form slots 52 or notches between their confronting surfaces. Slots 52 are adapted to receive therein a flat springy head 101 which has an ear 102 to which is soldered or otherwise attached the end of a conductor 99 opposite to that which is attached to tang 66. Head 101 is formed integral with an intermediate portion 103 which is connected to head 101 by a flexible bend portion 104 and carries at its outer or opposite end a domed or rounded contact 105. On body 55 adjacent each slot 52 there is located an identifying character 8. If desired, body 55 may be closed by a cover (not shown in the drawing) which may be applied to the front face of the rotor and which may have elongated holes therein through which contacts 105 protude so as to engage the contacts 7 of the adjacent disc.

When it is desired to rearrange the ciphering arrangement, each of two or more heads 101 is flexed and lifted out of the slot 51 which it occupies and is slid into another slot thereby varying the connections through the rotor.

I claim:

1. In a cryptographing machine, a commutator comprising a disc of insulation having an axial opening therethrough and having a peripheral flange thereon, and having plurality of slots formed in its inner surface, a plurality of contacts anchored in a ring in one surface of said disc, a plurality of second contacts each having a springy end retaining that contact in readily detachable position in one of said slots and a springy intermediate portion and a contact proper supported by said intermediate portion, and conductors connecting said contacts to said second contacts in pairs disposed heterogeneously around said ring.

2. In a commutator for a cryptographing machine, a disc having a plurality of contacts on one face thereof each having a portion extending through said disc, a plurality of apertures in the other face thereof, means for providing variable electrical paths through said commutator including connecting wires each secured at one end to one of said contact portions and each having secured to its other end a member of springy material having one element fitting when deformed into one of said apertures and another element lying flat and substantially parallel to the face of said commutator and forming a contact proper when said firstmentioned element is deformed and fitted into one of said apertures.

3. A commutator or the like comprising a disc having a plurality of relatively narrow slots formed in one face thereof adjacent the periphery thereof, a plurality of conducting members each including an end portion arranged substantially flush with the other face of said disc and a portion extending through said disc, and a plurality of contact members each comprising a contact proper, a supporting arm, and an end portion of elastic material fitting when deformed into one of said slots and thereupon pressing against the sides of its slot to hold its contact proper firmly in position, and flexible means for connecting in pairs said contact members to said extending portions of said conducting members.

* * * * *